United States Patent
Haldar

(10) Patent No.: US 7,155,421 B1
(45) Date of Patent: Dec. 26, 2006

(54) METHOD AND SYSTEM FOR DYNAMIC VARIATION OF DECISION TREE ARCHITECTURE

(75) Inventor: Debashis Haldar, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 638 days.

(21) Appl. No.: 10/272,378

(22) Filed: Oct. 16, 2002

(51) Int. Cl.
*G06F 17/00* (2006.01)
*G06N 5/02* (2006.01)

(52) U.S. Cl. .......................................... 706/46; 705/12
(58) Field of Classification Search ................ 706/12, 706/45, 46; 705/12
See application file for complete search history.

(56) References Cited

U.S. PATENT DOCUMENTS

| | | | |
|---|---|---|---|
| 5,574,828 A * | 11/1996 | Hayward et al. ............. | 706/45 |
| 5,995,951 A * | 11/1999 | Ferguson ..................... | 706/10 |
| 6,189,029 B1 * | 2/2001 | Fuerst ........................ | 709/217 |
| 6,304,861 B1 * | 10/2001 | Ferguson ..................... | 706/10 |
| 6,373,483 B1 * | 4/2002 | Becker et al. ............... | 345/419 |
| 6,470,229 B1 * | 10/2002 | Wang et al. ................. | 700/121 |
| 6,493,693 B1 * | 12/2002 | Hill ............................. | 706/46 |
| 6,704,719 B1 * | 3/2004 | Ericson ....................... | 706/48 |
| 6,820,070 B1 * | 11/2004 | Goldman et al. ............. | 706/46 |
| 2002/0023064 A1 * | 2/2002 | Grimse et al. ................ | 706/19 |
| 2003/0101086 A1 * | 5/2003 | San Miguel .................. | 705/9 |
| 2003/0191726 A1 * | 10/2003 | Kirshenbaum ............... | 706/12 |
| 2003/0233274 A1 * | 12/2003 | Urken et al. ................. | 705/12 |

OTHER PUBLICATIONS

Corduneau, Adrian. A Pylonic Decision-Tree Language Model with Optimal Question Selection. Universit of Toronto. pp. 606-609.*
DeSantic, G. and Gallupe B. (1985) Group Decision Support Systems: A New Frontier.*
Yacoub, S; Lin X; Simske, S; and Burns J. (2003) Automating the Analysis of Voting Systems.IEEE.*

* cited by examiner

*Primary Examiner*—Anthony Knight
*Assistant Examiner*—Sunray Chang

(57) ABSTRACT

A method and system for selecting and presenting questions to users is provided. The method and system provides for a decision-tree architecture that functionally changes form as users traverse the tree, depending on the responses provided by the users.

29 Claims, 3 Drawing Sheets

| Node ID | Question | Answer 1 | Next Node | Threshold 1 | Answer 2 | Next Node | Threshold 2 | Answ. 3 | ... |
|---|---|---|---|---|---|---|---|---|---|
| 1 | Meeting? | Yes | 2 | -- | No | End | -- | -- | -- |
| 2 | Day? | Thurs | 3 | 60% | Friday | 3 | 60% | ... | ... |
| 3 | Time? | Noon | 4 | 4 users | P.M. | 7 | 4 users | ... | ... |
| 4 | Food? | Yes | 5 | 20% | No | 7 | 50% | -- | -- |
| 5 | Type? | Pizza | 6 | 4 users | Burgers | 6 | 4 users | ... | ... |
| 6 | From? | ... | 7 | 50% | ... | 7 | 50% | ... | ... |
| 7 | Agenda? | Sales | ... | 1 user | R&D | ... | 2 users | ... | ... |
| ... | ... | ... | ... | ... | ... | ... | ... | ... | ... |

Figure 4

| Node ID | Question | Answer 1 | Next Node | Answer 2 | Next Node | Threshold for All Answers to a Question | ... |
|---|---|---|---|---|---|---|---|
| 1 | Meeting? | Yes | 2 | No | End | Determine that the difference in the quantities of users selecting the first most popular answer and the second most popular answer is greater than the quantity of remaining users. | -- |
| 2 | Day? | Thurs | 3 | Friday | 3 | 60% | ... |
| ... | ... | ... | ... | ... | ... | ... | ... |

Figure 5

| Users | Answer Weight | Final Say | ... |
|---|---|---|---|
| User 1 | = 1 user | No | ... |
| User 2 | = 3 users | Yes | ... |
| User 3 | = 2 users | No | ... |
| ... | ... | ... | ... |

Figure 6

METHOD AND SYSTEM FOR DYNAMIC VARIATION OF DECISION TREE ARCHITECTURE

BACKGROUND

1. Field of the Invention

The present invention relates to computer communications and more particularly to logic that governs communication between a computer (e.g., server) and a plurality of users (e.g., client stations).

2. Description of the Related Art

It is often desirable to ask a group of people a plurality of questions and to responsively receive a plurality of answers. More particularly, it is often desirable to compile the responses to the plurality of questions, to coordinate the activities of the group, to plan an event, or to survey the group's opinions, for example. One way of asking questions and receiving answers is for each member of the group to be together in a room. Of course, this is not always possible or convenient. Another method of asking questions and receiving answers is for the group to correspond via email or via instant messaging ("IM"). The more members of the group, however, the more network resources and/or bandwidth the email or IM exchange occupies. In addition, users may spend valuable time reading through email and responses. More particularly, users may spend valuable time reading questions that other users may have already answered or decided upon.

Due to the deficiencies in the existing art, a need exists for an improved, more efficient method and system to facilitate asking questions to and receiving answers from a group of people.

SUMMARY

According to an exemplary embodiment of the invention, a computer will be programmed with a set of logic in the form of a decision tree. Pursuant to the logic, the computer will present a question to the user and will then receive a user response to the question. In turn, based on the user response, the computer will select and present a next question to the user and will receive a user response to that next question. This will continue for as long as defined by the decision tree, and the computer may collect (record) the user's responses for subsequent analysis or processing. Advantageously, the decision-tree logic can be used to collect responses from a group of users, such as members of a corporate department or other group. And the collected responses could then function as a basis for planning, analysis, or other decision-making functions.

In accordance with the exemplary embodiment, the decision-tree architecture will be arranged to functionally change form as users traverse the tree, depending on the responses provided by the users. For instance, once a threshold number or percentage of users have selected a given answer to a multiple-choice question, there may be little or no use in presenting that question and other optional answers to the subsequent users. Therefore, in that instance, the computer could programmatically eliminate the question and instead proceed at that point to ask only a follow-up question to the given answer.

The invention is applicable largely regardless of the messaging scheme or transport mechanism that is used to convey communications between the computer and the users. (The computer might communicate with users through a local I/O interface, or through a network. Further, various communication protocols could be used, examples of which include hypertext transfer protocol ("HTTP") and session initiation protocol ("SIP"), for instance).

BRIEF DESCRIPTION OF THE DRAWINGS

Exemplary embodiments of the present invention are described herein with reference to the drawings, in which:

FIG. 4 is a diagram depicting database records of nodes for a decision tree used by a computer system in accordance with an exemplary embodiment of the present invention; and FIG. 5 is a diagram depicting database records of nodes for a decision tree used by a computer system in accordance with an exemplary embodiment of the present invention; and FIG. 6 is a diagram depicting database records of users of a decision tree used by a computer system in accordance with an exemplary embodiment of the present invention.

DETAILED DESCRIPTION OF AN EXEMPLARY EMBODIMENT

1. Base Decision-Tree Architecture

A decision tree of an exemplary embodiment of the invention can take the form of a set of related database records or "nodes." For instance, each node or database record can have fields defining (i) a question, (ii) a first answer, (iii) a pointer to a next node that corresponds to the first answer, (iv) a second answer, (v) a pointer to a next node that corresponds to the second answer, and so forth. The tree would extend from a root node and would define branches, each ending with a final or "leaf" node. A leaf node could simply define a question with answers and not point to any next nodes.

Figure 1:
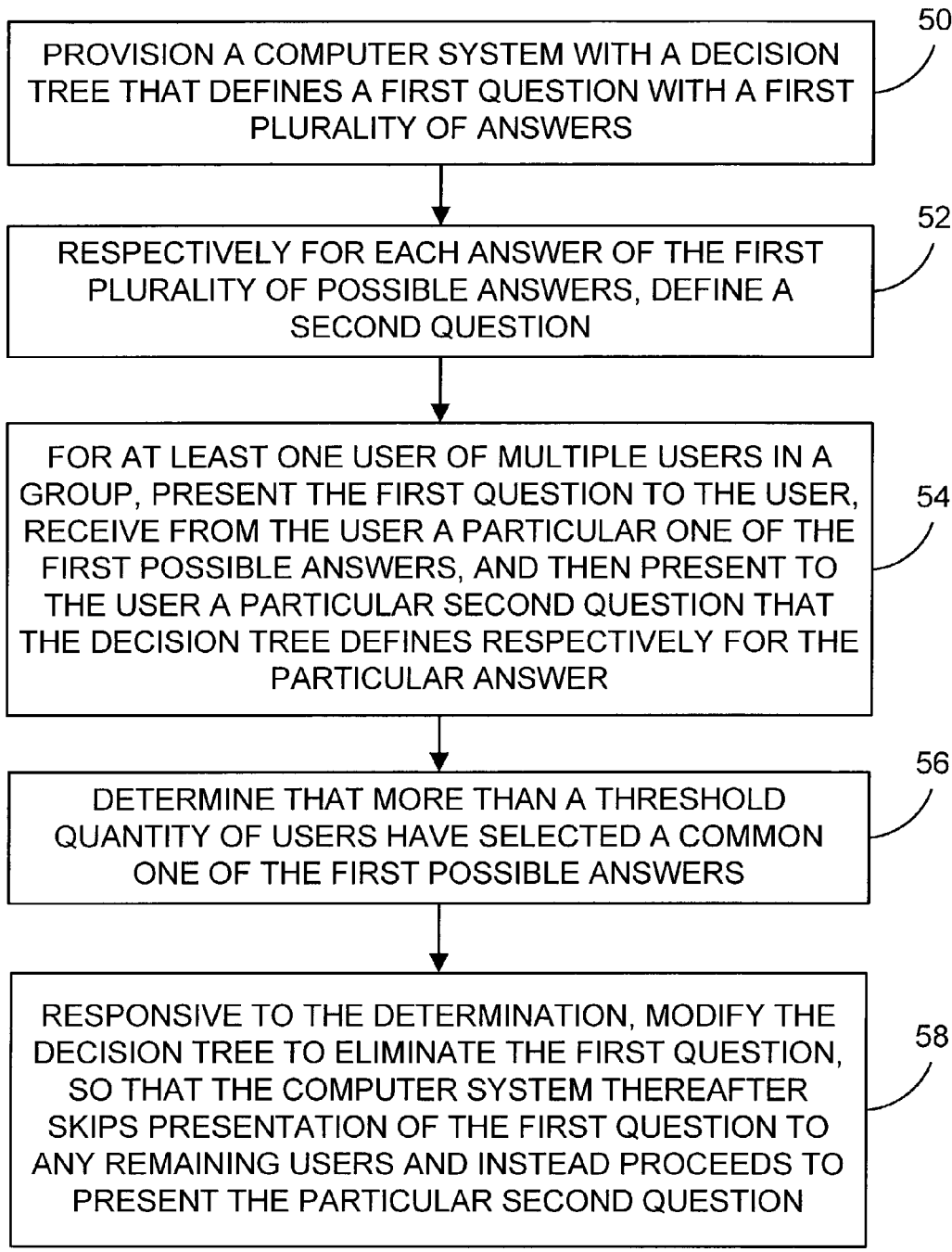
FIG. 1 is a flow chart depicting a process carried out by a computer system in accordance with an exemplary embodiment of the present invention.

Referring to the drawings, FIG. 1 is a simplified flow chart of a process carried out by a computer system in accordance with an exemplary embodiment of the present invention. By way of example, a processor executing a set of machine language instructions stored in memory or other data storage may carry out the various functions performed by the exemplary computer system to which FIG. 1 refers. Provided with the present disclosure, those skilled in the art can readily prepare appropriate computer instructions to perform such functions.

It should be understood, however, that the arrangements described herein relating to the exemplary computer system are set forth for purposes of example only. As such, those skilled in the art will appreciate that other arrangements and other elements (e.g., machines, interfaces, functions, orders of functions, etc.) can be used instead, and some elements may be omitted altogether. Further, many of the elements described herein may be functional entities that can be implemented as discrete or distributed components or in conjunction with other components, and in any suitable combination and location. Still further, various functions described herein as being performed by one or more entities may be carried out by hardware, firmware, and/or software logic.

Referring back to FIG. 1, an administrator (e.g., a user) could provision the decision tree logic into the exemplary computer system, through a suitable provisioning application. For instance, as indicated at block 50 of FIG. 1, the provisioning application could prompt the administrator to specify a first question and a first set of answers and could receive the question and answers from the administrator. For each answer, as indicated at block 52, the application could then prompt the administrator to provide a second question and answers if desired and could then receive the question and answers. And the application could continue in this manner until directed by the administrator. For each question, the application could establish a corresponding database record as a node of the tree, and for each answer, the application could establish a respective child node if desired. Further, it is understood that the first and second question referenced above are relative and could refer to any two questions in a decision tree.

2. Use of Decision-Tree Logic to Collect Responses from a Group of Users

Advantageously, as shown at block 54 of FIG. 1, the decision tree logic can be used to collect responses from a group of users, such as members of a corporate department or other group. And the collected responses could then function as a basis for planning, analysis, or other decision-making functions.

For example, as a mechanism to determine whether and how to hold a meeting, the decision tree may first ask a user if the user is in favor of having a meeting. If the user responds "No," then the tree may end. But if the user responds "Yes," then the tree may give the user three options of dates on which to hold the meeting. In turn, depending on the date selected, the tree may give the user several options of times of day to hold the meeting. Depending on the time and date selected, the tree may then ask the user if the user is favor of having food at the meeting. And if the user responds "Yes," the tree may then give the user several options of types of food. And, in turn, based on the type of food selected, the tree may give the user several options of restaurants from which to order the food.

In this example, as each user traverses the decision tree, the computer may programmatically record the user's responses. So as multiple users traverse the decision tree, the computer may compile multiple users' responses. In turn, the computer may tabulate the responses as survey results (or votes) and produce an output report indicating the most favored view of whether to hold a meeting, when to hold the meeting, whether to have food at the meeting, what type food to have, and where to get the food for the meeting. Depending on the tabulated results, a meeting could then be set up accordingly.

3. Dynamic Variation of Decision Tree Architecture

Figure 2:
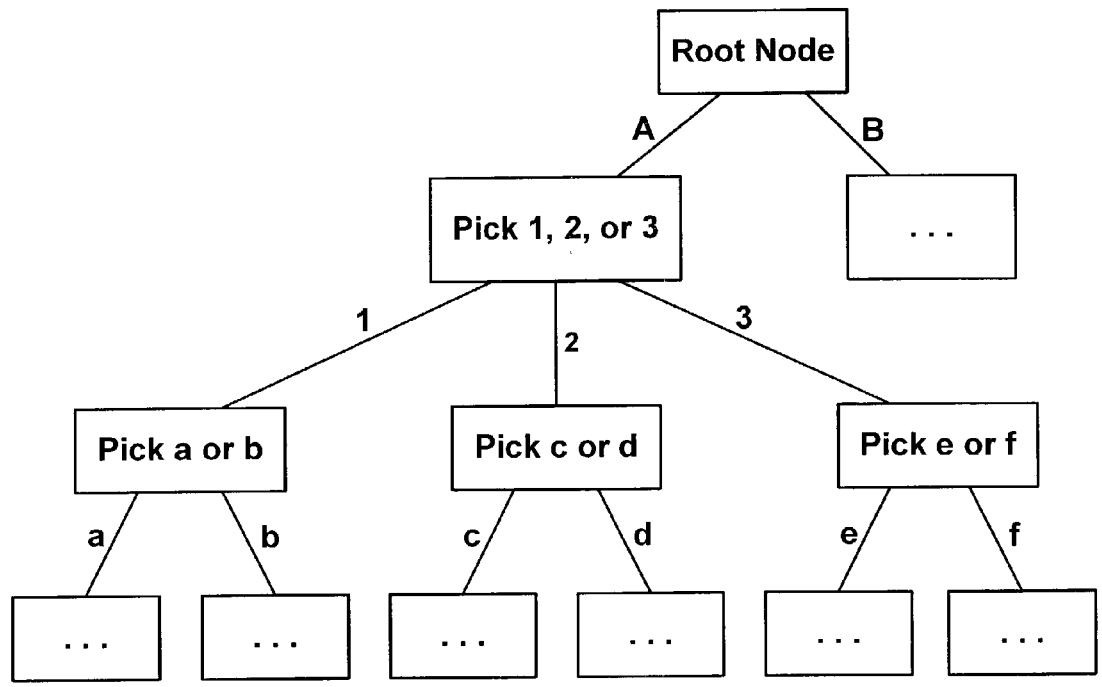
FIG. 2 is a diagram of a decision tree.

Referring to the drawings, FIG. 2 depicts a decision tree and helps illustrate how the decision-tree architecture could be arranged to functionally change form as users traverse the tree, depending on the responses provided by the users. As shown in FIG. 2, the decision tree has a root node that defines a first question with possible answers A and B, each pointing to a respective child node. Answer A points to a child node ("node A") that defines a question ("question A") with possible answers 1, 2, or 3, each of which points to a child node. In turn, answer 1 points to a child node ("node 1") that defines a question ("question 1") with possible answers a and b, answer 2 points to a child node ("node 2") that defines a question ("question 2") with possible answers c and d, and answer 3 points to a child node ("node 3") that defines a question ("question 3") with possible answers e and f. Each of nodes a–f could similarly define a question with possible answers corresponding to subsequent children nodes, and so forth. (In FIGS. 2 and 3, ellipses in a node generally represent a question.)

In this example decision tree, node A could further define a threshold quantity of users who must select (or not select) a given answer 1, 2, or 3 in order to justify modification of the decision tree. As indicated at block 56 of FIG. 1, the exemplary computer system could then determine that more than a threshold quantity of users have selected one of the possible answers. For instance, once more than 50% of a given group of users have selected answer 1, a reasonable conclusion may be that answer 1 is the popular view of the group of users, so it would make little or no sense to give subsequent users the option of selecting answer 2 or answer 3.

As a further example, node A could define a threshold quantity of users based on the inability of subsequent users to change the popular view of the group of users. The exemplary computer system could determine if the difference between the quantities of users who have selected the two most popular answers to a given question is greater than the quantity of users who have not yet selected an answer to that question. If there are not enough remaining users to change the most popular answer, it would make little or no sense to give subsequent users the option of selecting answers to that question.

Figure 3:
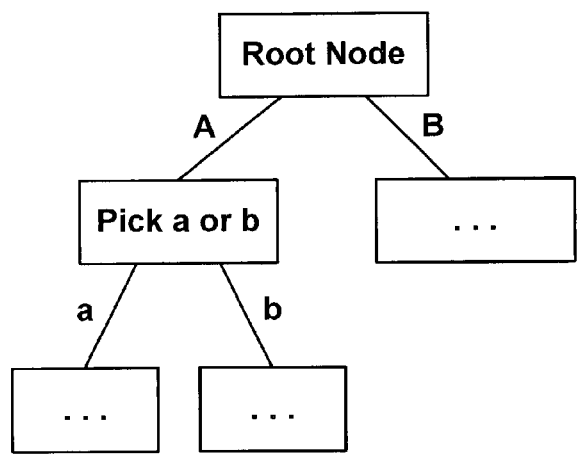
FIG. 3 is a diagram of a decision tree that has been modified according to an embodiment of the present invention.

Consequently, as indicated at block 58 of FIG. 1, the exemplary computer system could modify the decision tree for subsequent users. In the instance of node A in FIG. 2, the exemplary computer system could programmatically change the decision tree so that node A defines question 1 (with possible answers a and b) instead of question A (with possible answers 1, 2, and 3). In practice, the exemplary computer system could do so by changing the root node so that answer A points to node 1, instead of to node A, as illustrated by FIG. 3. Once the exemplary computer system changes the decision tree in that manner, as the next user traverses the tree and selects answer A, the exemplary computer system would proceed to present the user with question 1, rather than with question A.

As a particular example, continuing with the meeting-planning example noted above, the decision tree node that asks whether to have food at the meeting could define a threshold of 20% of users responding "Yes". Once 20% of users have responded "Yes," the exemplary computer system may then eliminate the question of whether to have food at the meeting and, for subsequent users, instead proceed directly to the question of what type of food to have at the meeting. In turn, the node that asks what type of food to have at the meeting could define a threshold of 30% of users (which, depending on how the tree is provisioned, may be 30% of users who did not answer "No" to the previous, or one of the previous, questions) opting for Italian food. Thus, once 30% of users have selected Italian food in response to the question, the exemplary computer system may eliminate the question of what type of food to have at the meeting and, for subsequent users, instead proceed directly to the question of which restaurant should supply the food.

Further, a node that asks which restaurant should supply the food could define a threshold for which the exemplary computer system determines that the remaining users cannot change the most popular answer. For example, there may be thirty users in a group, and ten users may have selected a first most popular answer to the question, five users may have selected a second most popular answer, and four users may have not yet selected an answer. The exemplary computer system may eliminate this question because the answer of the four remaining users will have no effect on a determination of the most popular answer (even if all four remaining users select the second most popular answer).

In addition, thresholds may require a minimum number of users, or remaining users, responding before a threshold is triggered. For instance, a threshold may require 40% of remaining users, but only after 50% of remaining users have responded. Other examples are possible as well.

4. Provisioning a Decision Tree

As noted above, an administrator might provision a decision tree through a suitable provisioning application. In accordance with the exemplary embodiment, the provisioning application can also allow the administrator to specify a threshold number or percentage of users who should select a given answer to a question in order to justify eliminating the question from the decision tree.

FIG. 4 illustrates an example of a database table of the type an administrator might use to provision a decision tree similar to the decision tree discussed in the paragraphs above. Most likely, the exemplary computer system will prompt an administrator to provision information for the example database table of FIG. 4. A computer system may, however, receive database table information from the administrator in other ways.

By way of example, the table of FIG. 4 defines seven database records, or nodes, of an exemplary decision tree, each identified with a "Node ID" 1 through 7 ("node 1" through "node 7"). Also by way of example, the table of FIG. 4 defines a plurality of fields (depicted as columns) to correspond to each node of the decision tree. (In FIG. 4, ellipses represent any number of additional records or fields, and, generally, an administrator may provision a decision tree with any number of records or fields.) Thus, as shown in FIG. 4, each node of the decision tree could define a question and a number of answers and, for each answer, could define (i) a pointer to a next node (the "Next Node" column) and (ii) a traversal-threshold for elimination of the question from the decision tree (the "threshold" column). The table of FIG. 5 is generally analogous to the table of FIG. 4, but differs in several respects as discussed below.

At node 1 of the decision tree depicted in FIG. 4, an administrator has provisioned a question ("question 1") of whether the user favors having a meeting. (For purposes of clarity, question 1 and all questions in FIG. 4 are shown shortened to one word. These questions could, of course, be any length.) As shown in FIG. 4, the administrator has provisioned two answers to question 1, "Yes" and "No." For each answer, the administrator has provisioned a pointer to a next node. Thus, if a user answers "Yes" to a meeting, the decision tree will direct the user to node 2, at which node the administrator has provisioned a question 2 of the decision tree. If the user answers "No" to question 1, in the example of FIG. 4, the decision tree ends for that user.

Referring now to node 2 of FIG. 4, the administrator has provisioned a question 2 of what day to have the meeting. For each of the two answers shown in FIG. 4, the administrator has provisioned a traversal-threshold quantity of users, "60%" for both the "Thursday" and "Friday" answers. Thus, if more than 60% of the users answer either "Thursday" or "Friday" to question 2, the exemplary computer system would dynamically alter node 1 such that a "Yes" answer points to node 3 instead of node 2. Subsequent users may receive a notification of the eliminated question and the chosen answer.

An administrator will most likely provision nodes with traversal-thresholds based on a quantity of users. An administrator will also most likely provision a decision tree with a threshold quantity of users either by defining a threshold quantity of users for each answer in the tree, as shown in FIG. 4, by defining a threshold quantity of users for each question in the tree, as shown in FIG. 5, or by defining a common threshold quantity of users for use with every answer in a decision tree. As demonstrated by the traversal-threshold of node 2 in FIG. 4, the quantity of users may be a percentage of users who select a given answer. Or as demonstrated by the traversal-threshold of node 3 in FIG. 4, the quantity of users may be a number of users who select a given answer. Or as demonstrated by the traversal-threshold of node 1 in FIG. 5, the traversal-threshold may be a determination that the remaining users will have no effect on the most popular answer. Traversal-thresholds could take other forms as well and could further consider the level of traversal of other nodes.

Referring now to node 3 of FIG. 4, the administrator has provisioned a question 3 of what time to have the meeting. The administrator has provisioned answer 1 of node 3 with a pointer, such that if a user selects answer 1, "noon," node 3 will point the user to node 4 (allowing the user to answer questions directed to whether to have lunch at the meeting and what type of food to have). The administrator has further provisioned answer 2 of node 3 with a pointer, such that if a user selects answer 2, "afternoon," node 3 will point the user to node 7 (allowing the user to skip questions directed to lunch at the meeting).

As discussed above, for each of the two answers shown in node 3 of FIG. 4, the administrator has defined a traversal-threshold with a quantity of users, "4 users" for both the "noon" and "afternoon" answers. Thus, if more than four users select the "noon" answer, the exemplary computer system would dynamically alter node 2 such that either a "Thursday" or "Friday" answer points to node 4 instead of node 3. Again, subsequent users may receive a notification of the eliminated question and the chosen answer. Likewise, if more than four users select the "afternoon" answer, the exemplary computer system would dynamically alter node 2 such that either a "Thursday" or "Friday" answer points to node 7 instead of node 3.

As a further example, an administrator can further assign user-specific weights to answers selected by certain users ("weighting the answers"). For instance, an administrator provisioning a decision tree may weight the answers of, for example, an executive or upper-level member in an organization more heavily than the answers of a lower-level member of an organization. In such a case, the executive's answer to a question might equal three answers toward a threshold, for example. Further, the exemplary computer system, when determining that more than a threshold quantity of users have selected an answer, will apply the weighted answers toward the threshold.

FIG. 6 illustrates an example of a table, which can be, for example, a "look-up table," of the type an administrator might use to assign user-specific weights, or to "weight answers." By way of example, the table of FIG. 6 defines database records for three users of an exemplary decision tree, user 1 through user 3. Also by way of example, the table of FIG. 6 defines a plurality of fields (depicted as columns) to correspond to each user of the decision tree. (In FIG. 6, ellipses represent any number of additional records or fields, and, generally, an administrator may provision a decision tree with any number of records or fields.) An administrator can programmatically link a table or tables, like the exemplary table in FIG. 6, to the decision tree such that when a certain user traverses the decision tree and, for instance, answers questions, the exemplary computer system can reference the table and "look-up" information contained in the fields corresponding to that user.

In the table of FIG. 6 an administrator has provisioned the field "Answer Weight" with user-specific weights for the exemplary computer system to apply to answers selected by certain users. Thus, the administrator has weighted answers by user 1 to equal the answer of one user, answers by user 2 to equal the answers of three users, and answers by user 3 to equal the answers of two users. Other answer-weighting schemes are possible.

It is also possible for an administrator to assign to certain members of a group veto power or "final say" over a question. Thus, if one of the members of a group with final say selects "No" in response to a question of whether to have food at a meeting, there will be no food at the meeting and the exemplary computer system will modify the decision tree for all users accordingly.

The exemplary table of FIG. 6 illustrates how an administrator can assign to users of a decision tree with "final say" power. In the table of FIG. 6, an administrator has provisioned the field "Final Say" with a user-specific indication, a "Yes" or a "No," corresponding to whether a user has "final say" over questions. Thus, when that user traverses the decision tree and, for instance, answers questions, the exemplary computer system can reference the table and "look-up" user information. Although not shown, the table of FIG. 6 may be further provisioned to define only certain questions over which a user has "final say." Other "final say" provisioning schemes are possible.

In addition, an administrator can provision other user-specific information into the fields of a table (or into the fields of multiple tables) like the table shown in FIG. 6, and the administrator can programmatically link these additional fields to the decision tree.

To apply the decision tree in practice, an administrator might then set in the exemplary computer system a total number of users in the group at issue, so that the exemplary computer system could calculate percentages of users who traverse various nodes (if necessary, i.e., if a traversal-threshold is percentage based). Users may then traverse the decision tree, receiving questions from the exemplary computer system and providing responses to the exemplary computer system. And as the users traverse the tree, the exemplary computer system may regularly monitor the traversal-thresholds of the various nodes to determine whether to modify the tree, and, in response to each determination that a traversal-threshold is met, the exemplary computer system may eliminate a question accordingly.

5. Instant Messaging Scenario

As noted above, the present invention can be applied in various scenarios, largely regardless of the mechanism used for communication between the exemplary computer system and the various users. In one exemplary arrangement, for instance, the exemplary computer system and users could communicate by exchanging instant messages, such as SIP "MESSAGE" messages for instance. In this scenario, the exemplary computer system could itself be an IM server, which normally functions to forward instant messages from one user to another.

Through use of a suitable provisioning application such as described above, an administrator could establish a decision tree that includes one or more traversal-thresholds and could program the IM server with the decision tree. In this regard, the provisioning application may reside on the IM server and may thereby establish the decision tree directly on the server. Alternatively the provisioning application may reside on some other system, and, after establishing the decision tree, the administrator could then load or "post" the decision tree to a suitable host application on the IM server.

Further, the administrator could instruct the IM server to present the decision tree to a particular group of users. The administrator could specify the group as a list of names or SIP addresses for instance. Or the group could be a list of "IM buddies" that the IM server already associates with each other. Typically, the IM buddies defining the group would be those buddies would are currently "online" and running a client IM application on their local computers.

In turn, the IM server may then send the root node question as an instant message to all of the members of the group. And each member would then respond to that question by selecting one of the possible answers and sending to the IM server an instant message indicating the selected answer. As the IM server receives a user's answer to a given question, the IM server may then select a next question to present to that user, and the IM server may send the next question as another instant message to the user.

As the IM server interacts in this manner with the various users in the group, the IM server may regularly log the users' responses to the various questions, and the IM server may monitor traversal-thresholds to determine whether to dynamically modify the decision tree for subsequent user interactions. If the IM server determines that a traversal-threshold is met, then the IM server may eliminate a respective question and other descendant nodes, as described above and as shown by way of example in FIGS. 1 and 2. In turn, as the IM server continues to interact with users, the IM server will then apply the dynamically revised decision tree.

6. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. In a computer system that is provisioned with a decision tree that defines a first question with a plurality of possible answers, and that defines, respectively for each answer of the plurality of possible answers, a second question, a method comprising:

with respect to at least one user of multiple users in a group, the computer system presenting the first question to the user, receiving from the user a particular one of the plurality of possible answers, and then presenting to the user a particular second question that the decision tree defines respectively for the particular answer;

the computer system making a determination that more than a threshold quantity of users in the group have selected a common one of the possible answers to the first question; and responsive to the determination, the computer system modifying the decision tree to eliminate the first question, so that the computer system thereafter skips presentation of the first question to any remaining users in group and instead proceeds to present the particular second question.

2. The method of claim 1, wherein presenting the first question to the user comprises sending the first question to the user as an instant message.

3. The method of claim 1, wherein receiving from the user a particular one of the possible answers comprises receiving the particular one of the possible answers as an instant message from the user.

4. The method of claim 1, wherein the threshold quantity of users is a number of users.

5. The method of claim 1, wherein the threshold quantity of users is a percentage of users in the group.

6. The method of claim 1, further comprising:
for at least one user, weighting the particular one of the plurality of possible answers received; and
wherein the computer system, when performing the step of making a determination that more than a threshold quantity of users in the group have selected a common one of the possible answers to the first question, applies the weighted answer toward the threshold quantity of users.

7. The method of claim 6, wherein weighting the particular one of the plurality of possible answers received comprises:
assigning user-specific weights for the computer system to apply to the particular one of the plurality of possible answers selected by the at least one user; and
programmatically linking the assigned user-specific weights to the decision tree.

8. The method of claim 1, further comprising:
assigning to at least one user final say power over the first question;
programmatically linking the assigned final say power to the decision tree;
the computer system making a determination that at least one user with final say power over the first question has selected one of the possible answers to the first question; and
responsive to the determination, the computer system modifying the decision tree to eliminate the first question, so that the computer system thereafter skips presentation of the first question to any remaining users in the group and instead proceeds to present the particular second question.

9. The method of claim 1, further comprising notifying a subsequent user that the computer system modified the decision tree to eliminate the first question and notifying the subsequent user of the common one of the possible answers to the first question that the group selected.

10. The method of claim 1, wherein the computer system making a determination that more than a threshold quantity of users in the group have selected a common one of the possible answers to the first question comprises the computer system making a determination that the difference between a first quantity of users in the group that have selected a first most popular answer to the first question and a second quantity of users in the group that have selected a second most popular answer to the first question is greater than a third quantity of users in the group that have not yet selected an answer to the first question.

11. A system comprising:
a processor;
data storage; and
machine language instructions stored in the data storage and executable by the processor;
(i) to provision a computer system with a decision tree that defines a first question with a plurality of possible answers, and that defines, respectively for each answer of the plurality of possible answers, a second question;
(ii) with respect to at least one user of multiple users in a group, to present the first question to the user, to receive from the user a particular one of the plurality of possible answers, and then to present to the user a particular second question that the decision tree defines respectively for the particular answer;
(iii) to make a determination that more than a threshold quantity of users in the group have selected a common one of the possible answers to the first question; and
(iv) responsive to the determination, to modify the decision tree to eliminate the first question, so that the computer system thereafter skips presentation of the first question to any remaining users in the group and instead proceeds to present the particular second question.

12. The system of claim 11, wherein the machine language instructions executable by the processor to present the first question to the user are further executable by the processor to send the first question to the user as an instant message.

13. The system of claim 11, wherein the machine language instructions executable by the processor to receive from the user a particular one of the possible answers are further executable by the processor to receive the particular one of the possible answers as an instant message from the user.

14. The system of claim 11, wherein the threshold quantity of users is a number of users.

15. The system of claim 11, wherein the threshold quantity of users is a percentage of users in the group.

16. The system of claim 11, wherein the machine language instructions are further executable by the processor to provision at least one of the plurality of possible answers with a threshold quantity of users.

17. The system of claim 11, wherein the machine language instructions are further executable by the processor to weight, for at least one user, the particular one of the plurality of possible answers received; and
wherein the machine language instructions executable by the processor to make a determination that more than a threshold quantity of users in the group have selected a common one of the possible answers to the first question, are further executable by the processor to apply the weighted answer toward the threshold quantity of users.

18. The system of claim 11, wherein the machine language instructions are further executable by the processor:
(i) to assign to at least one user final say power over the first question;
(ii) to programmatically link the assigned final say power to the decision tree;
(iii) to make a determination that at least one user with final say power over the first question has selected one of the possible answers to the first question; and
(iv) responsive to the determination, to modify the decision tree to eliminate the first question, so that the computer system thereafter skips presentation of the first question to any remaining users in the group and instead proceeds to present the particular second question.

19. The system of claim 11, wherein the machine language instruction executable by the processor to make a determination that more than a threshold quantity of users in the group have selected a common one of the possible answers to the first question are further executable by the processor to make a determination that the difference between a first quantity of users in the group that have selected a first most popular answer to the first question and a second quantity of users in the group that have selected a second most popular answer to the first question is greater than a third quantity of users in the group that have not yet selected an answer to the first question.

20. A machine-readable medium encoded with instructions executable by a processor to carry out functions to administer a decision tree that defines a first question with a plurality of possible answers, and that defines, respectively for each answer of the plurality of possible answers, a second question, comprising:

with respect to at least one user of multiple users in a group, presenting the first question to the user, receiving from the user a particular one of the plurality of possible answers, and then presenting to the user a particular second question that the decision tree defines respectively for the particular answer;

making a determination that more than a threshold quantity of users in the group have selected a common one of the possible answers to the first question; and responsive to the determination, modifying the decision tree to eliminate the first question to thereafter skip presentation of the first question to any remaining users in the group and instead proceed to present the particular second question.

21. The machine-readable medium of claim 20, wherein presenting the first question to the user comprises sending the first question to the user as an instant message.

22. The machine-readable medium of claim 20, wherein receiving from the user a particular one of the possible answers comprises receiving the particular one of the possible answers as an instant message from the user.

23. The machine-readable medium of claim 20, wherein the threshold quantity of users is a number of users.

24. The machine-readable medium of claim 20, wherein the threshold quantity of users is a percentage of users in the group.

25. The machine-readable medium of claim 20, further comprising:

for at least one user, weighting the particular one of the plurality of possible answers received; and wherein, when performing the function of making a determination that more than a threshold quantity of users in the group have selected a common one of the possible answers to the first question, applying the weighted answer toward the threshold quantity of users.

26. The machine-readable medium of claim 25, wherein weighting the particular one of the plurality of possible answers received comprises:

assigning user-specific weights to apply to the particular one of the plurality of possible answers selected by the at least one user; and programmatically linking the assigned user-specific weights to the decision tree.

27. The machine-readable medium of claim 20, further comprising:

assigning to at least one user final say power over the first question;

programmatically linking the assigned final say power to the decision tree;

making a determination that at least one user with final say power over the first question has selected one of the possible answers to the first question; and responsive to the determination, modifying the decision tree to eliminate the first question to thereafter skip presentation of the first question to any remaining users in the group and instead proceed to present the particular second question.

28. The machine-readable medium of claim 20, wherein the computer system making a determination that more than a threshold quantity of users in the group have selected a common one of the possible answers to the first question comprises the computer system making a determination that the difference between a first quantity of users in the group that have selected a first most popular answer to the first question and a second quantity of users in the group that have selected a second most popular answer to the first question is greater than a third quantity of users in the group that have not yet selected an answer to the first question.

29. In a computer system that is provisioned with a decision tree that defines a first question with a plurality of possible answers, and that defines, respectively for each answer of the plurality of possible answers, a second question, a method comprising:

with respect to at least one user of multiple users in a group, the computer system presenting the first question to the user, receiving from the user a particular one of the plurality of possible answers, and then presenting to the user a particular second question that the decision tree defines respectively for the particular answer;

making a determination that the difference between a first quantity of users in the group that have selected a first most popular answer to the first question and a second quantity of users in the group that have selected a second most popular answer to the first question is greater than a third quantity of users in the group that have not yet selected an answer to the first question; and responsive to the determination, the computer system modifying the decision tree to eliminate the first question, so that the computer system thereafter skips presentation of the first question to any remaining users in the group and instead proceeds to present the particular second question.

* * * * *